(12) United States Patent
Tseng et al.

(10) Patent No.: US 8,547,343 B2
(45) Date of Patent: Oct. 1, 2013

(54) DISPLAY APPARATUS

(75) Inventors: Hsu-Hsiang Tseng, Taoyuan (TW); Wen-Shu Chien, Taoyuan (TW)

(73) Assignee: HTC Corporation, Taoyuan (TW)

( * ) Notice: Subject to any disclaimer, the term of this patent is extended or adjusted under 35 U.S.C. 154(b) by 314 days.

(21) Appl. No.: 12/425,659

(22) Filed: Apr. 17, 2009

(65) Prior Publication Data

US 2010/0073321 A1 Mar. 25, 2010

(30) Foreign Application Priority Data

Sep. 22, 2008 (TW) .............................. 97136293 A (51) Int. Cl.
*G06F 3/041* (2006.01)

(52) U.S. Cl.
USPC ....................... 345/173; 178/18.03; 178/18.07

(58) Field of Classification Search
USPC ........... 345/173–178, 156; 178/18.06–18.08, 178/18.03
See application file for complete search history.

(56) References Cited

U.S. PATENT DOCUMENTS

| | | | | |
|---|---|---|---|---|
| 6,862,019 B2 * | 3/2005 | Kobayashi et al. | ............ | 345/173 |
| 7,486,281 B2 * | 2/2009 | Kobayashi et al. | ............ | 345/173 |
| 7,786,980 B2 * | 8/2010 | Lashina | .......... | 345/173 |
| 7,903,094 B2 * | 3/2011 | Katsuhito et al. | ............. | 345/173 |
| 7,966,573 B2 * | 6/2011 | Dodge et al. | .................. | 715/815 |
| 8,183,476 B2 * | 5/2012 | Fukushima et al. | ....... | 178/18.07 |
| 2004/0263483 A1 * | 12/2004 | Aufderheide | ................. | 345/173 |
| 2006/0109252 A1 * | 5/2006 | Kolmykov-Zotov et al. | . | 345/173 |
| 2006/0279548 A1 * | 12/2006 | Geaghan | ........................ | 345/173 |
| 2007/0034423 A1 * | 2/2007 | Rebeschi et al. | ........... | 178/18.06 |
| 2007/0236478 A1 * | 10/2007 | Geaghan et al. | ............. | 345/173 |
| 2007/0252821 A1 * | 11/2007 | Hollemans et al. | ........... | 345/173 |
| 2008/0309627 A1 * | 12/2008 | Hotelling et al. | ............. | 345/173 |
| 2009/0040192 A1 * | 2/2009 | Haga | .............................. | 345/174 |
| 2009/0058829 A1 * | 3/2009 | Kim et al. | ..................... | 345/173 |
| 2009/0207140 A1 * | 8/2009 | Hansson | ....................... | 345/173 |
| 2009/0315848 A1 * | 12/2009 | Ku et al. | ....................... | 345/173 |
| 2010/0026656 A1 * | 2/2010 | Hotelling et al. | ............. | 345/174 |

FOREIGN PATENT DOCUMENTS

| | | |
|---|---|---|
| CN | 1811684 | 8/2006 |
| WO | 2005/022373 | 3/2005 |
| WO | 2006/003588 | 1/2006 |

OTHER PUBLICATIONS

Office Action from corresponding Chinese Application No. 200810165931.1 dated Dec. 2, 2010.
Office Action from corresponding Taiwanese Application No. 097136293 dated Feb. 14, 2012. English translation attached.

\* cited by examiner

*Primary Examiner* — Dmitriy Bolotin (74) *Attorney, Agent, or Firm* — Grossman, Tucker, Perreault & Pfleger, PLLC (57) ABSTRACT

A display apparatus is provided. The display apparatus comprises a display module and an antenna module. The display module is adapted to display a plurality of function icons. When the antenna module detects the approaching of an input device, such as the finger of the user or a metal element, the display module displays an indicator. The indicator is able to overlap at least one of the plurality of function icons, and the user can conveniently and correctly choose the function icon he or she needs without touching the display apparatus.

12 Claims, 6 Drawing Sheets

DISPLAY APPARATUS

This application claims priority to Taiwan Patent Application No. 097136293 filed on Sep. 22, 2008, the disclosure of which is incorporated by reference herein in its entirety.

CROSS-REFERENCES TO RELATED APPLICATIONS

Not applicable.

BACKGROUND OF THE INVENTION

1. Field of the Invention

The present invention provides a display apparatus, and more particularly, provides a display apparatus with an antenna module so that users can select a function without touching the display apparatus.

2. Descriptions of the Related Art

With the coming of the information age, various portable electronic apparatuses are widely used. To enhance the competitiveness of the products, almost all manufacturers of portable electronic apparatuses are making efforts to integrate various new functions into the products. Users often need to use various objects as media to control electronic products. Generally, when using a portable electronic apparatus such as a mobile phone, a personal digital assistant (PDA) or any other wireless communication device, a display apparatus, e.g., a touch display or a non-touch display, will display a plurality of function icons for a user's selection. For example, touch panels generally fall into four categories: resistive touch panels, capacitive touch panels, surface acoustic wave touch panels and optical touch panels, which are adapted to sense different objects so that the user is allowed to properly select a desired function properly. On the other hand, in order for the user to select a desired function, non-touch displays mostly require the use of a pointing device (e.g., a mouse or a keyboard or any other similar device) for controlling an indicator on the display.

Portable electronic apparatuses can only be provided with small-sized displays in consideration of the size of the portable electronic apparatuses themselves. In application, if a function icon presented on the display is relatively small or if the indicator fails to give a stable indication, the user might touch the wrong icon, making it difficult to select the desired function and causing unnecessary problems. The problem is especially common when the user uses a finger as the object to operate the capacitive touch display.

Currently, some portable electronic apparatuses that have incorporated capacitive touch displays are using application software. When the user clicks a certain function icon, a local area around the function icon is magnified so that through the magnified image, the user may easily select a key corresponding to the desired function, thereby reducing errors and mistakes. However, in application, the user has to enable the local image magnifying function before he or she can select a desired function to be enabled, leading to an overall decreased operational efficiency. Furthermore, the locally magnified image also indirectly interferes with the normal presentation of other images on the display.

Accordingly, it is highly desirable in the art to provide a display apparatus for use in a touch display and/or non-touch display that allows users to properly select a desired function without interfering with the presentation of original images on the display.

SUMMARY OF THE INVENTION

One objective of this invention is to provide a display apparatus in which at least one electromagnetic induction space is established by an antenna module, so that the antenna module can detect a relative position of an object when the object enters the at least one electromagnetic induction space. In this way, by using the object, the user is able to move an indicator displayed on the display apparatus to a desired function icon.

Another objective of this invention is to provide a display apparatus that, by means of at least one electromagnetic induction space established by an antenna module, allows the user to select a function without touching the display apparatus.

This invention provides a display apparatus, which comprises a display panel, a display module, an antenna module and a control circuit. The display module is disposed inside the display panel, and is configured to display a plurality of function icons via the display panel for selection by the user. The antenna module is adapted to establish at least one electromagnetic induction space outside the display panel. The antenna module is adapted to generate at least one electromagnetic induction signal in response to the position of the object. The control circuit is configured to generate a relative position signal in response to the at least one electromagnetic induction signal. The display module is configured to display an indicator on the display module in response to the relative position signal, and is configured to select and activate a function icon in the region indicated by the indicator.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, this invention will be explained with reference to embodiments thereof. This invention relates to a display apparatus which, by use of an antenna module, allows the user to select the desired function without having to touch the display apparatus. However, these embodiments are not intended to limit this invention to any specific environment, applications or particular implementations described in these embodiments. Therefore, the description of these embodiments is only for a purpose of an illustration rather than to a limitation. It should be noted that in the following embodiments and attached drawings, elements not related directly to this invention are omitted from depiction; and dimensional relationships among individual elements in the attached drawings are illustrated only for ease of understanding, but not to limit the actual scale.

Figure 1:
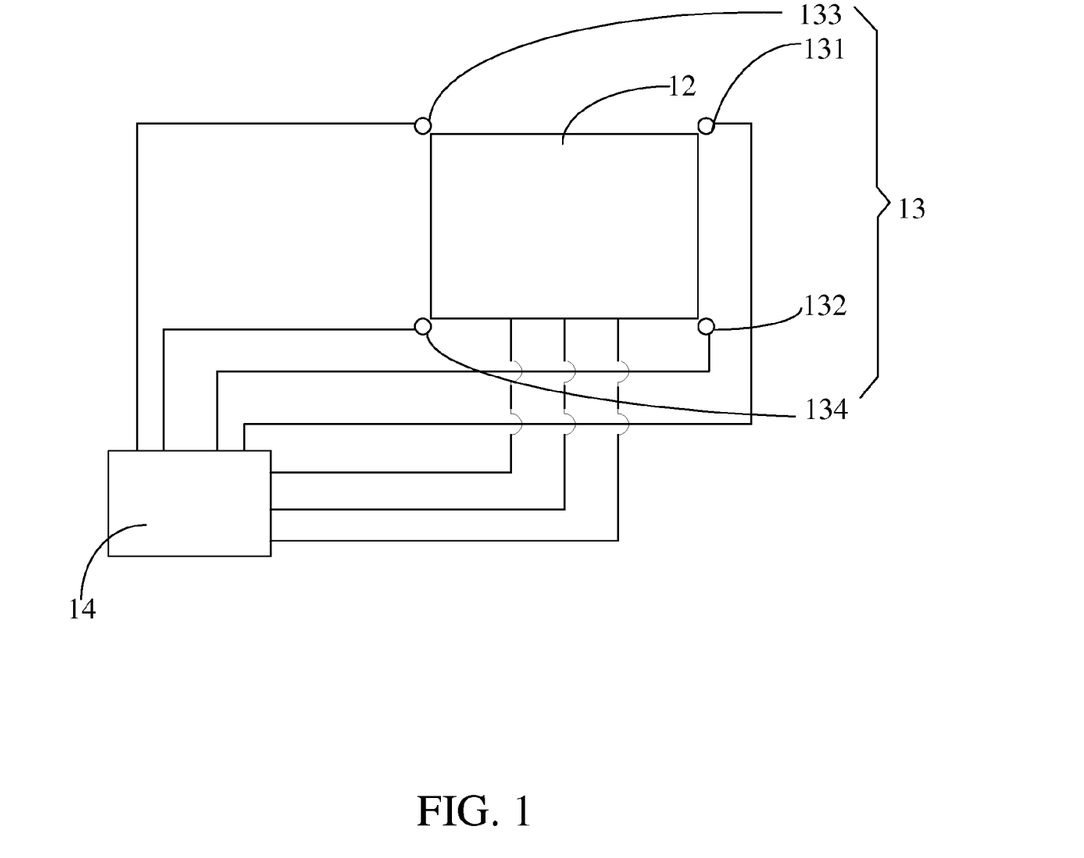
FIG. 1 is a schematic view illustrating the internal circuitry of the first embodiment of a display apparatus according to this invention.

FIG. 1 illustrates a schematic view of the internal circuitry of the first embodiment of a display apparatus 1 according to this invention. The display apparatus 1 comprises a display panel 11 (illustrated in FIG. 2a, which depicts a schematic perspective view of the display apparatus of this invention), a display module 12, an antenna module 13 and a control module 14. The display apparatus of this invention is applicable to portable electronic apparatuses that incorporate a touch display and/or a non-touch display.

Figure 2A:
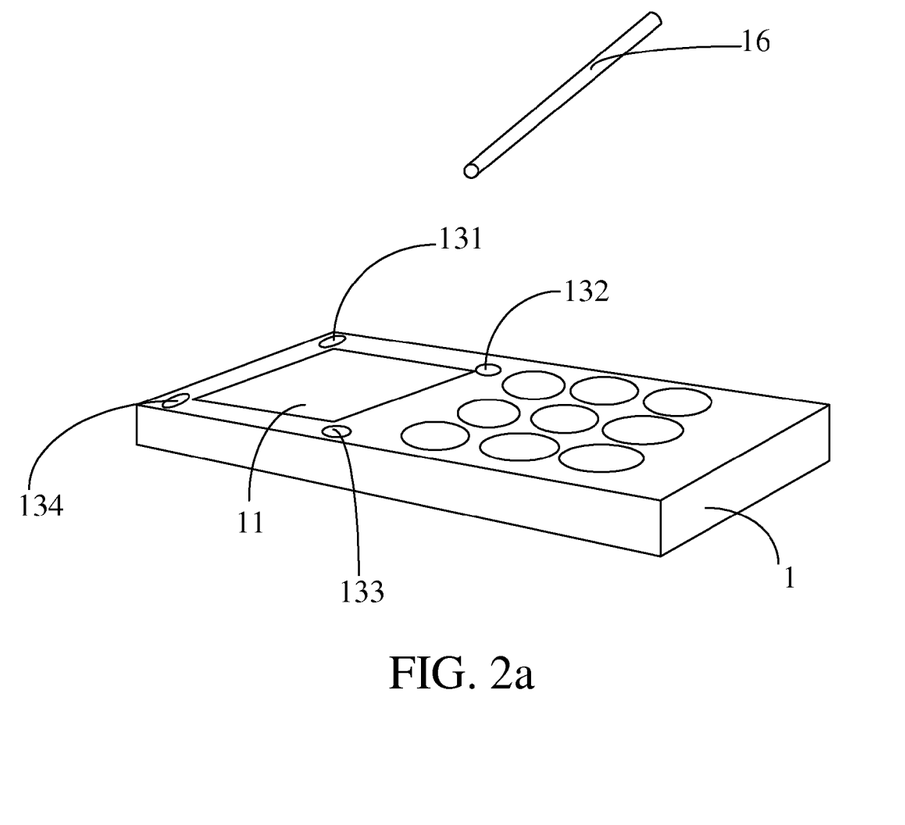
FIG. 2a is a schematic perspective view of the first embodiment of the display apparatus according to this invention.
Figure 3:
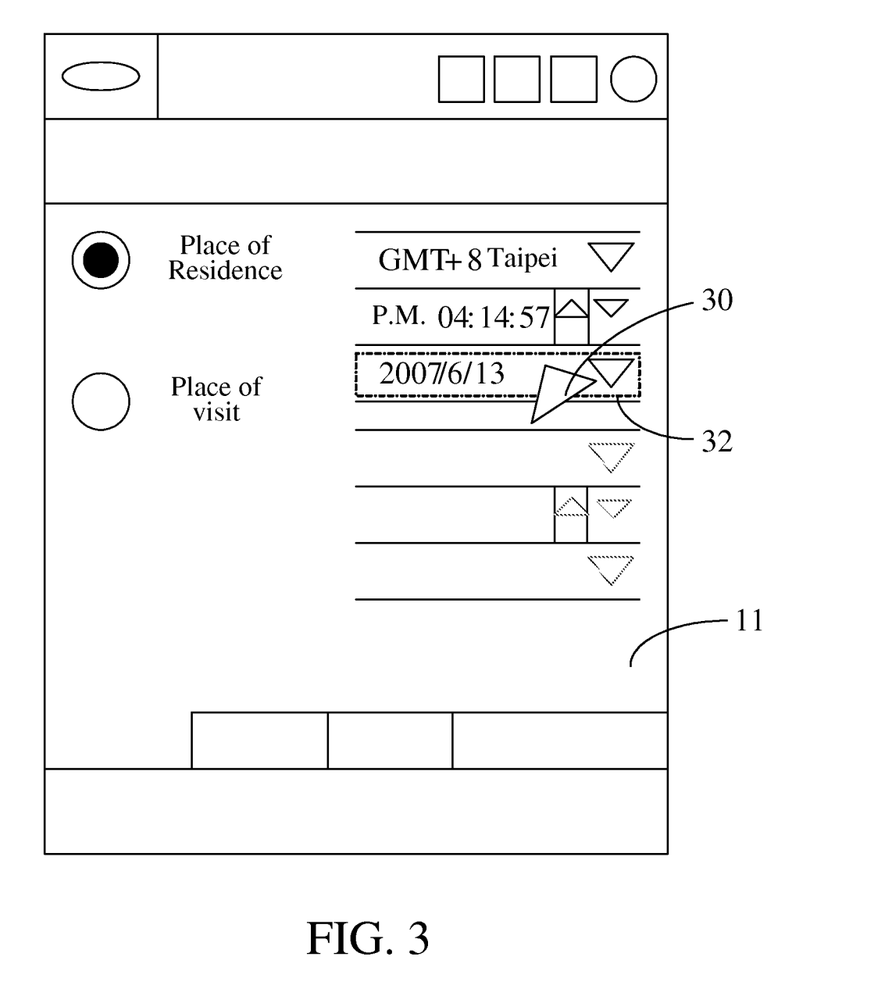
FIG. 3 is a schematic view of a window illustrating an operation of the display module according to this invention.

FIG. 2a illustrates a schematic perspective view of the first embodiment of the display apparatus according to this invention. The display module 12, which is disposed inside the display panel 11, is configured to display a plurality of function icons via the display panel 11. For example, the display module 12 may display the time zone and time data pertaining to a region where the user lives, as shown in FIG. 3.

Figure 2B:
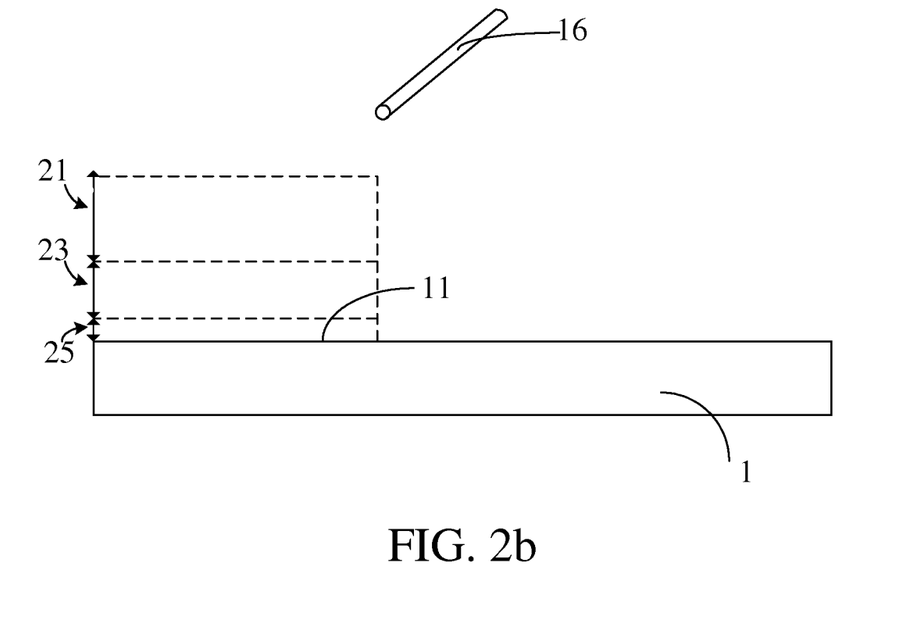
FIG. 2b is a schematic side view of the first embodiment of a display apparatus according to this invention.

In addition, FIG. 2b illustrates a schematic side view of the first embodiment of the display apparatus according to this invention to facilitate the description of the electromagnetic induction space established by the antenna module. In this embodiment, the antenna module 13 is disposed adjacently to the display panel 11. The antenna module 13 is adapted to sequentially establish a first electromagnetic induction space 21, a second electromagnetic induction space 23 and a third electromagnetic induction space 25 outside the display panel 11. The antenna module 13 comprises four sensing antennas 131, 132, 133 and 134 disposed inside the display panel 11 at the four corners thereof. In other embodiments, the antenna module 13 may also comprise at least two sensing antennas to establish each of the aforesaid electromagnetic induction spaces and to sense the position of the object 16. The sensing antennas 131~134 may be implemented by a printed circuit board (PCB) formed with metal wiring, which is simple in structure and sensitive to the object.

Then, when the object 16 enters the first electromagnetic induction space 21, the antenna module 13 is adapted to generate a first electromagnetic induction signal. When the object 16 moves in the first electromagnetic induction space 21, the antenna module 13 will generate a first electromagnetic induction signal that varies with the positions of the object 16. For example, in this embodiment, when the object 16 is closer to the sensing antenna 131 but further away from the sensing antenna 134, the sensing antenna 131 will excite relatively stronger electromagnetic induction while the sensing antenna 134 will excite relatively weaker electromagnetic induction. In response to the movement of the object 16, the sensing antennas 131~134 jointly excites the first electromagnetic induction signal that is varying. The control circuit 14 is electrically connected to the antenna module 13, and is configured to generate a relative position signal representing the relative position of the object relative to the display panel 11 in response to the first electromagnetic induction signal. The display module 12 is adapted to display an indicator in response to the relative position signal. Thus, as the object 16 moves in the first electromagnetic induction space 21, the indicator moves within the display panel accordingly in response to a change in a position of the object 16. In this way, the user is able to move the indicator to a desired position, i.e., the user can have at least a portion of the indicator overlap one of the plurality of function icons.

The second electromagnetic induction space 23 is located between the first electromagnetic induction space 21 and the display panel 11. When the object 16 keeps at least a portion of the indicator overlapped with one of the plurality of function icons presented on the display module and enters the second electromagnetic induction space 23, the antenna module 13 is adapted to generate a second electromagnetic induction signal. Then in response to the second electromagnetic induction signal, the control circuit 14 generates a select signal for the object 16 relative to the display panel 11 so that the display module 12 is adapted to select one of the plurality of function icons according to the relative position signal and the select signal.

The third electromagnetic induction space 25 is located between the second electromagnetic induction space 23 and the display panel 11. When the object 16 keeps the indicator at a status where one of the plurality of function icons is selected and enters the third electromagnetic induction space 25, the antenna module 13 is adapted to generate a third electromagnetic induction signal. Then in response to the third electromagnetic induction signal, the control circuit 14 generates the activation signal for the object 16 relative to the display panel 11 so that the display module 12 is adapted to select one of the plurality of function icons according to the relative position signal, the select signal and the activation signal.

In particular, when the position of the object 16 is adapted to keep the selected function icon under the selected status, the selected function icon can be activated successfully once the object 16 enters the third electromagnetic induction space 25.

In this embodiment, the first electromagnetic induction space 21, the second electromagnetic induction space 23 and the third electromagnetic induction space 25 respectively have an average vertical dimension of substantially about 3 cm, 2 cm and 2 mm; i.e., the first electromagnetic induction space 21, the second electromagnetic induction space 23 and the third electromagnetic induction space 25 respectively have an effective detection range of about 3 cm, 2 cm and 2 mm in the vertical direction. The effective detection ranges of the electromagnetic induction spaces depend on the dimensions of the display panel. These average vertical dimensions are provided only for purpose of illustration, rather than to limit this invention. In other embodiments, depending on different designs, the electromagnetic induction spaces may have average vertical dimensions larger than those of this embodiment by even an order of magnitude. For example, an average vertical dimension is 20-30 cm for the first electromagnetic induction space when the display apparatus is used in an on-board portable electronic apparatus.

FIG. 3 depicts an exemplary process where this invention is applied. An indicator 30 generated on the display module 12 is a cursor-like arrow, which can be moved by a user by moving the object 16. In this embodiment, the user is desired to select a function icon 32, i.e., a date icon. When the object 16 enters the first electromagnetic induction space 21 at a distance of about 5 cm above the display panel 11, entrance of the object 16 will be detected by the antenna module 13. In response to this, the antenna module 13 generates a first electromagnetic induction signal. The control circuit 14 generates a relative position signal for the object 16 relative to the display panel 11 while the display module 12 displays the indicator 30 in response to this relative position signal. When the object 16 enters the second electromagnetic induction space 23, a frame appears around the function icon 32 as shown in FIG. 3 to inform the user that the function icon 32 has been properly selected. Once the object 16 further enters the third electromagnetic induction space 25, the function icon 32 is activated to allow the alteration of the date.

It should be noted that apart from the manner described above, the selected function icon may also be activated in other manners, which will be described respectively hereinbelow.

Figure 4A:
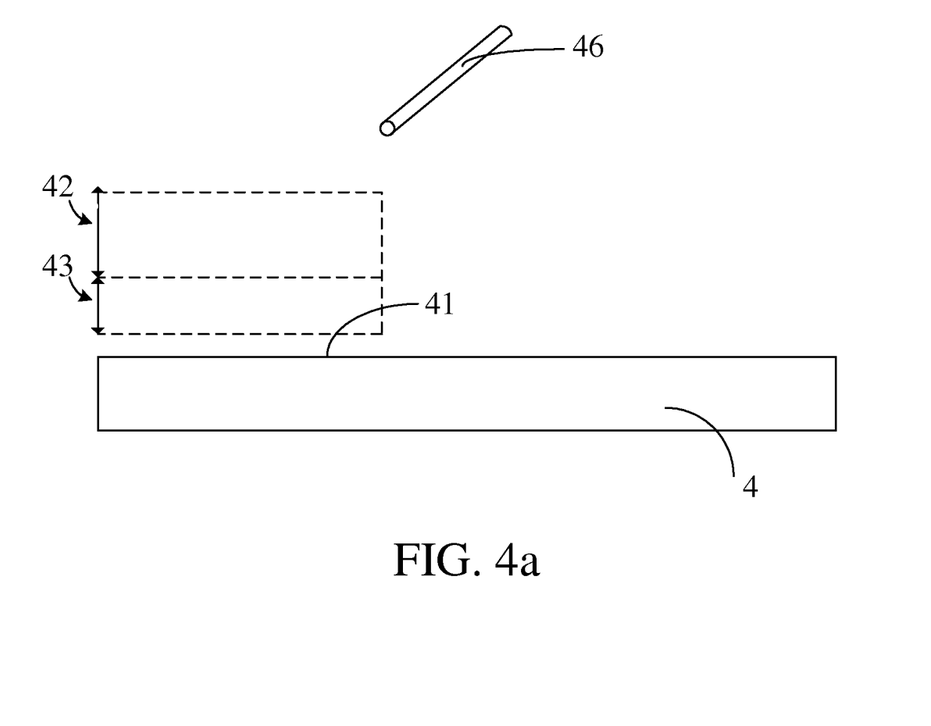
FIG. 4a is a schematic side view of the second embodiment of the display apparatus according to this invention.

FIG. 4a illustrates a schematic side view of the second embodiment of the display apparatus according to this invention. The display apparatus 4 of this embodiment has the same internal circuitry as that of FIG. 1. The first electromagnetic induction space 42 and second electromagnetic induction space 43 are established outside the display panel 41. This embodiment differs from the first embodiment mostly in that the third electromagnetic induction space is unnecessary in the second embodiment. When an object 46 approaches the display panel 41 from above, the control circuit detects a staying time for the object 46 in the second electromagnetic induction space 43. If the staying time is longer than the predetermined time, the control circuit generates an activation signal so that the display module is adapted to activate the function icon in response to the relative position signal, the select signal and the activation signal. That is, in this embodiment, once a function icon is selected, the display apparatus 4 can activate the selected function icon by determining the staying time of the object that stays in the second electromagnetic induction space 43 without establishing the third electromagnetic induction space.

Figure 4B:
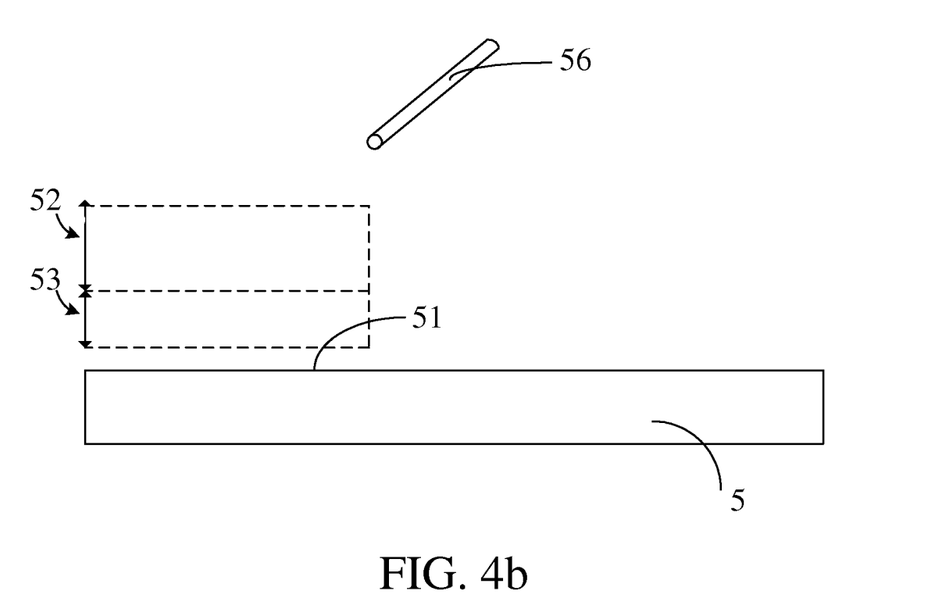
FIG. 4b is a schematic side view of the third embodiment of the display apparatus according to this invention.

FIG. 4b illustrates a schematic side view of the third embodiment of the display apparatus according to this invention. The display apparatus 5 of this embodiment has the same internal circuitry as that of FIG. 1. The first electromagnetic induction space 52 and second electromagnetic induction space 53 are established outside the display panel 51. This embodiment differs from the first embodiment mostly in that the third electromagnetic induction space is unnecessary in the third embodiment. When an object 56 is positioned above the display panel 51 and then moves away from the second electromagnetic induction space 53 in a direction away from the display panel 51, the control circuit generates an activation signal so that the display module is adapted to activate the function icon in response to the relative position signal, the select signal and the activation signal. That is, in this embodiment, once the user selects a function icon and moves the object away from the display panel 51, the selected function icon can be activated without establishing a third electromagnetic induction space.

In all the embodiments described above, the objects are unable to emit signals in an active way, and are selected from one of the following groups: a user's finger; and a metal object. All the embodiments described above are applicable to touch displays and/or non-touch displays. The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display apparatus, comprising:
   a display panel;
   a display module, disposed inside the display panel, in which the display module is configured to display a plurality of function icons via the display panel;
   an antenna module, disposed adjacently to the display panel, in which the antenna module comprises at least two sensing antennas and establishes a first electromagnetic induction space outside the display panel; and when an object enters the first electromagnetic induction space, the antenna module senses a change in an electromagnetic field in the first electromagnetic induction space and generates a first electromagnetic induction signal; and
   a control circuit, electrically connected to the antenna module; wherein the control circuit is configured to generate a relative position signal in response to the first electromagnetic induction signal; and wherein the relative position signal represents the relative position of the object relative to the display panel;
   wherein the display module is configured to display an indicator in response to the relative position signal.

2. The display apparatus as claimed in claim 1, wherein at least portion of the indicator overlaps one of the plurality of the function icons.

3. The display apparatus as claimed in claim 2, wherein the antenna module is further adapted to establish a second electromagnetic induction space outside the display panel; wherein the second electromagnetic induction space is located between the first electromagnetic induction space and the display panel; and when the object enters the second electromagnetic induction space, the antenna module is configured to generate a second electromagnetic induction signal; the control circuit is configured to generate a select signal for the object relative to the display panel in response to the second electromagnetic induction signal; and wherein the display module is configured to select one of the plurality of the function icons in response to the relative position signal and the select signal.

4. The display apparatus as claimed in claim 3, wherein the antenna module is configured to establish a third electromagnetic induction space outside the display panel; the third electromagnetic induction space is located between the second electromagnetic induction space and the display panel; and when the object enters the third electromagnetic induction space, the antenna module is configured to generate a third electromagnetic induction signal; the control circuit is configured to generate a activation signal for the object relative to the display panel in response to the third electromagnetic induction signal; the display module is configured to activate one of the plurality of the function icons in response to the relative position signal, the select signal, and the activation signal.

5. The display apparatus as claimed in claim 3, wherein the control circuit is further configured to detect a time period that the object stays in the second electromagnetic induction space and to generate a staying time; when the staying time exceeds a predetermined time, the control circuit generates a activation signal; and the display module is configured to activate one of the plurality of the function icons in response to the relative position signal, the select signal and the activation signal.

6. The display apparatus as claimed in claim 3, wherein when the object moves away from the second electromagnetic induction space, the control circuit generates a activation signal; and the display module is configured to activate one of the plurality of the function icons in response to the relative position signal, the select signal and the activation signal.

7. The display apparatus as claimed in claim 2, wherein the first electromagnetic induction space has an average vertical dimension of substantially three centimeters.

8. The display apparatus as claimed in claim 3, wherein the second electromagnetic induction space has an average vertical dimension of substantially two centimeters.

9. The display apparatus as claimed in claim 4, wherein the third electromagnetic induction space has an average vertical dimension of substantially two millimeters.

10. The display apparatus as claimed in claim 1, wherein the antenna module comprises four sensing antennas disposed inside the display panel at four corners thereof.

11. The display apparatus as claimed in claim 1, wherein the display module is a capacitive touch display.

12. The display apparatus as claimed in claim 1, wherein the object cannot actively emit a signal, and is selected from one of the following groups: a finger of a user; and a metal object.

* * * * *